United States Patent [19]
Fromherz

[11] Patent Number: 5,835,688
[45] Date of Patent: Nov. 10, 1998

[54] GENERIC METHOD FOR AUTOMATICALLY GENERATING FINITE-STATE MACHINES FOR SCHEDUDLING FROM PRINT ENGINE CAPABILITIES

[75] Inventor: Markus P. J. Fromherz, Palo Alto, Calif.

[73] Assignee: Xerox Corporation, Stamford, Conn.

[21] Appl. No.: 475,003

[22] Filed: Jun. 7, 1995

[51] Int. Cl.[6] .................................................. G06K 15/00
[52] U.S. Cl. ........................................... 395/112; 395/101
[58] Field of Search .................................... 395/112, 114, 395/101, 109, 115, 116, 117, 500, 650, 800, 700, 375, 550, 904, 674, 672, 670, 676, 701–712, 551–560; 355/202, 206, 209, 208, 323, 204, 203, 205, 318, 319, 320; 364/578, 468, DIG. 1, DIG. 2, 977.5, 149–151, 471.01–471.02, 468.01–468.06, 468.08–468.09, 468.13, 468.15; 358/296, 468; 399/8–9, 16–17, 27–28, 30, 364, 374, 370, 372, 43

[56] References Cited

U.S. PATENT DOCUMENTS

| | | | |
|---|---|---|---|
| 4,125,325 | 11/1978 | Batchelor et al. | 355/319 |
| 4,511,928 | 4/1985 | Colomb | 358/468 |
| 4,969,092 | 11/1990 | Shorter | 395/650 |
| 4,991,176 | 2/1991 | Dahbura et al. | 371/27 |
| 5,038,307 | 8/1991 | Krishnakumar et al. | 364/578 |
| 5,056,014 | 10/1991 | Burrows | 395/775 |
| 5,095,342 | 3/1992 | Farrell et al. | 355/319 |
| 5,095,369 | 3/1992 | Ortiz et al. | 358/296 |
| 5,107,299 | 4/1992 | Farrell et al. | 355/207 |
| 5,125,098 | 6/1992 | Burrows | 395/800 |
| 5,161,115 | 11/1992 | Teshima et al. | 364/551.01 |
| 5,179,410 | 1/1993 | Farrell et al. | 355/207 |
| 5,187,587 | 2/1993 | Farrell et al. | 358/296 |
| 5,224,207 | 6/1993 | Filion et al. | 395/101 |
| 5,287,194 | 2/1994 | Lobiondo | 395/114 |
| 5,301,100 | 4/1994 | Wagner | 364/148 |
| 5,317,757 | 5/1994 | Medicke et al. | 395/800 |
| 5,325,528 | 6/1994 | Klein | 395/650 |
| 5,337,135 | 8/1994 | Malachowski et al. | 355/319 |
| 5,363,175 | 11/1994 | Matysek | 355/208 |
| 5,402,367 | 3/1995 | Sullivan et al. | 364/578 |
| 5,422,705 | 6/1995 | Omelchenko et al. | 355/208 |
| 5,436,730 | 7/1995 | Hube | 395/115 |
| 5,502,543 | 3/1996 | Abovjaoude | 355/202 |
| 5,504,568 | 4/1996 | Saraswat et al. | 355/319 |
| 5,542,070 | 7/1996 | LeBlanc et al. | 395/500 |

OTHER PUBLICATIONS

Xerox Disclosure Journal; vol. 15, No. 5; Sep./Oct. 1990.

*Primary Examiner*—Edward L. Coles, Sr.
*Assistant Examiner*—Dov Popovici
*Attorney, Agent, or Firm*—Fay, Sharpe, Beall, Fagan, Minnich & McKee

[57] ABSTRACT

A system is provided for automatically analyzing timing constraints of capabilities, and establishing parameters for automatic generation of finite-state machines which schedule from print engine capabilities. The system generates a finite-state machine which encodes, for each capability, a means by which any given schedule may be extended to one that includes a correct or optimal schedule for that particular capability. The system generates finite-state machines for both forward and backwards scheduling. It is adapted for both greedy and optimal search strategies. The system facilitates selectively leaving classes of constraints for run-time checking in order to reduce a size of a finite-state machine. Finite machines so generated are suitably used with schedulers to alternately control operation of a print engine.

18 Claims, 7 Drawing Sheets

GENERIC METHOD FOR AUTOMATICALLY GENERATING FINITE-STATE MACHINES FOR SCHEDUDLING FROM PRINT ENGINE CAPABILITIES

BACKGROUND OF THE INVENTION

This is a related application to commonly owned U.S. patent application Ser. No. 08/485,848, filed Jun. 7, 1995, entitled A METHOD FOR AUTOMATICALLY DERIVING PRINT ENGINE CAPABILITIES FOR INCREMENTAL SCHEDULING FROM COMPOSITION PRINT ENGINE MODELS; U.S. patent application Ser. No. 08/476,510, filed Jun. 7, 1996, entitled A SYSTEM FOR GENERICALLY DESCRIBING AND SCHEDULING OPERATION OF A MODULAR PRINTING MACHINE; U.S. patent application Ser. No. 08/472,151, filed Jun. 7, 1995, entitled A GENERIC METHOD FOR DESCRIBING AND USING RESOURCES FOR PRINT ENGINE SCHEDULING; U.S. patent application Ser. No. 08/485,846, filed Jun. 7, 1995, entitled A SYSTEM FOR AUTOMATICALLY CONFIGURING PRINT ENGINE SOFTWARE FROM PRINT ENGINE MODULE CAPABILITIES; and U.S. patent application Ser. No. 08/486,646, filed Jun. 7, 1995, entitled A GENERIC METHOD FOR SCHEDULING PRINT ENGINES USING PRINT ENGINE CAPABILITIES; the contents of each of which are incorporated herein by reference.

This application pertains to the art of printing machines and more particularly to photo-duplication machines such as copiers.

The invention is particularly applicable to a system for generating finite-state machines for scheduling the operations necessary to produce desired documents on a print engine scheduling. The system allows for automated scheduling of printing jobs pursuant to the capabilities associated with modular components forming a printing machine, and will be described with particular reference thereto. However, it will be appreciated that the invention has broader application, such as providing for an automated assessment of machine capabilities in view of modular components, as well as job specific utilization in an efficient manner in view of the same.

Present day machinery, such as photocopiers, is often constructed from pre-fabricated components. Such fabrication allows for mass production of each of the subassemblies of a machine while simultaneously allowing for customization to consumer's needs. Further, a consumer is provided with a means by which he or she may alter or upgrade capabilities of an existing base unit.

Earlier systems for distributed printing and distributed job scheduling may be found in U.S. Pat. Nos. 5,287,194 and 5,363,175 commonly owned by the assignee hereof.

One concern with modular assembly of integrated units is provided with configuring and optimizing use of a completed system. While this is a concern for the manufacturer of an initial unit, it is perhaps an even greater concern to the end user. End users are often technically unsophisticated. However, they are driven by a desire for increased capability of a machine while maintaining the value of their initial investment. Consumers are also dissuaded from expenses associated with hiring a professional to upgrade or configure existing equipment.

To the extent earlier systems hoped to achieve automatic scheduling of print engine capabilities, such was accomplished only if a developer knew the particulars of a print engine beforehand. Even if individual modules were used, their interactions had to be analyzed and the resulting print engine information was generally not reusable.

SUMMARY OF THE INVENTION

The present invention contemplates a new and improved system for generating finite-state machines to facilitate automatic scheduling of printing machine operations which overcomes the above-referenced problems, and others, and provides a system with enhanced usability and configurability both prior to and after the machine leaves the factory.

In accordance with the present invention, there is provided a system for automatically generating finite-state machines for scheduling of print engine operation from descriptions of various individual modular machine components.

In accordance with another aspect of the present invention, a system is provided for automatically analyzing timing constraints of print engine capabilities to establish parameters for automatic generation of finite-state machines.

In accordance with another aspect of the present invention, the system provides for generation of finite-state machines adapted for both greedy and optimal search strategies.

In accordance with another aspect of the present invention, the system provides for a finite-state machine generator that allows for selectively leaving classes of constraints for run-time checking to reduce finite machine size.

An advantage of the present invention is the generation of a finite-state machine for printing machine operation scheduling that is conducive to being easily and automatically configured to various or varying subassemblies.

Another advantage of the present invention is the provision of a printing machine that is adapted to be readily configured to maximum potential by an end-user.

Yet another advantage of the present invention is a provision of a printing machine that maximizes printing throughput by being adapted for efficiently generating, scheduling, and utilizing modular subassemblies in accordance with user-specified print jobs.

Further advantages will become apparent to one of ordinary skill in the art upon a reading and understanding of the subject specification.

BRIEF DESCRIPTION OF THE DRAWINGS

The invention may take physical form in certain parts, and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
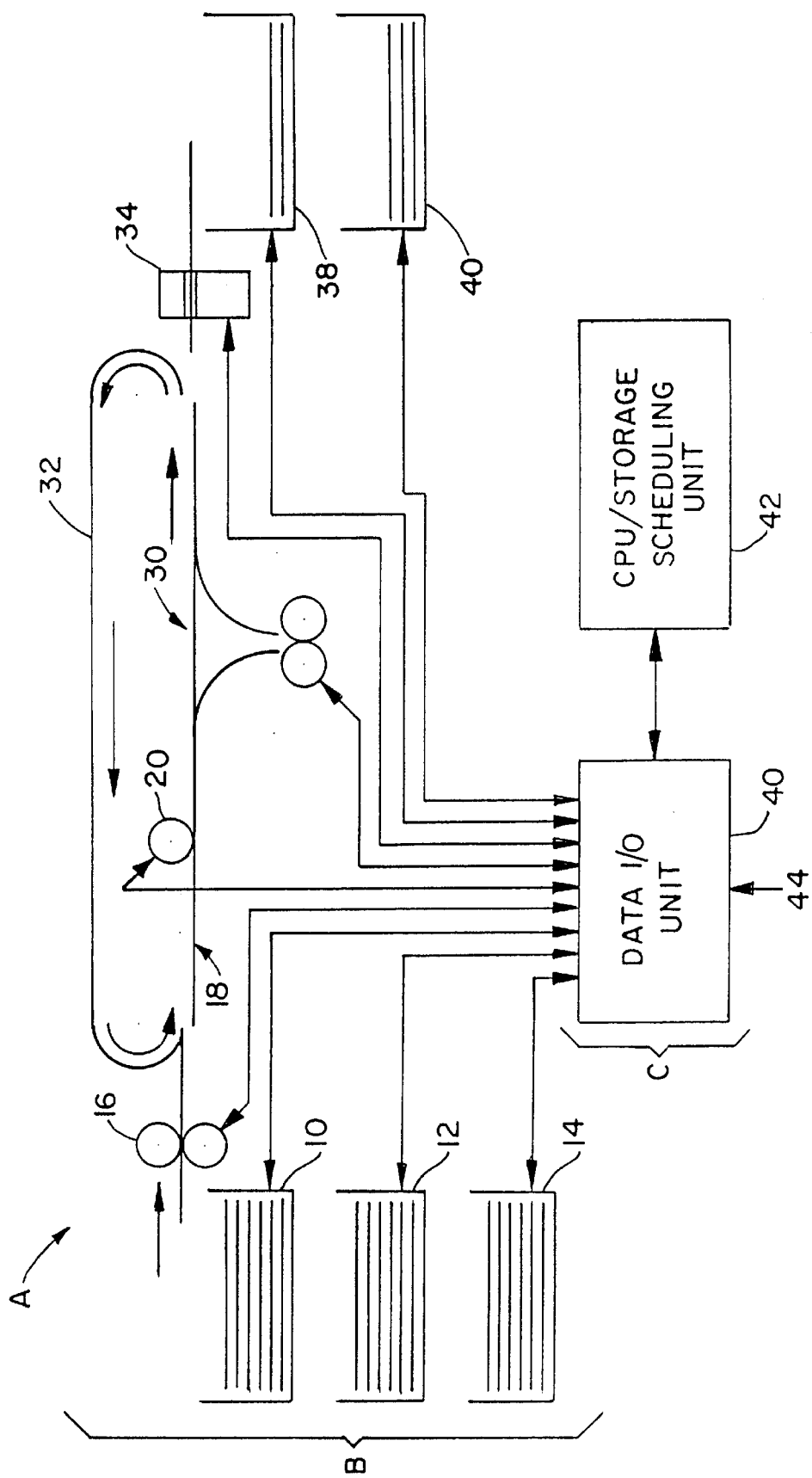
FIG. 1 provides a schematic of a representative, modular printing machine incorporating the automated configuration and scheduling of the subject invention.

Turning now to the drawings wherein the purpose is for illustrating the preferred embodiment of the invention only, and not for the purpose of limiting the same, FIG. 1 illustrates an embodiment of the subject invention having a modular print engine A which includes a plurality of modules or subassemblies B and a data-processor unit for configuration and scheduling C. As used herein "print engine" includes any reprographic machine, such as printers, copiers, facsimile machines, and the like.

As will be detailed below, various capabilities provided with each of the modules B are ascertained and correlated in the data processor unit C. Such correlated and analyzed data is further analyzed in view of user input defining a desired printer operation, or series of operations. This, in turn, is used to optimize, schedule, and control operation of the printing machine to most efficiently accomplish the series of printing tasks. The subject system is described by way of example with a copier machine. It will be appreciated that generic description, resource assessment and scheduling may be practicable on any modular, material handling system.

With the particular example of FIG. 1, the modules B are illustrated as including a plurality of paper storage bins. In the illustration, these include bins 10, 12, and 14. The plurality of bins may be representative of different paper sizes or secondary or reserved storage capability. A sheet feeder mechanism is illustrated schematically at 16. As will be appreciated by one of ordinary skill in the art, a sheet feeder such as that illustrated at 16 will function to obtain sheet stock from one or more of the bins.

The feeder 16 will feed sheet stock to a conveyor 18. The conveyor will, in turn, feed sheet stock to a print mechanism 20, the particular construction of which will be well within the understanding of one of ordinary skill in the art. Also illustrated in the figure is an inverter mechanism 30 that may selectively invert or flip sheet stock that progresses along the conveyor 18. A feedback-unit 32 is provided for returning sheet stock to the printer mechanism 20 for duplex printing thereof.

In the illustration, the conveyor 18 provides a path to a stapling mechanism 34 for selective stapling of printed documents. The final, illustrated component in the group of modules B illustrates a plurality of output bins represented by bins 38 and 40.

Turning to the data processor unit C, included therein is a data input/output ("I/O") unit 40 which is in data communication with a central processor unit ("CPU")/storage scheduling unit 42, the details of which will be described further below. A data path is provided between the data I/O unit 40 and each of the modules B.

In the preferred embodiment, each module B includes therein a description associated with various functions and capabilities thereof. The particulars of such a generic description will be detailed below. The data path between each of the illustrated modules and the data I/O unit allows for acquisition to the data processor unit C of all such description. In the preferred embodiment, any module B will communicate its associated description to the data I/O unit upon connection to the modular print engine A. This ability allows for "plug-and-play" capability of the subject system.

Data interconnections between the data I/O unit 40 of the data processor C and the various modules B also allow for controller activation thereof. Thus, the data processor unit C has ascertained from the available modules the complete set of capabilities of the modular print engine A. This information, coupled with user input 44 to the data I/O unit 40 allows for efficient scheduling of available, modular resources to accomplish a series of printing jobs by use of the available components.

Figure 2:
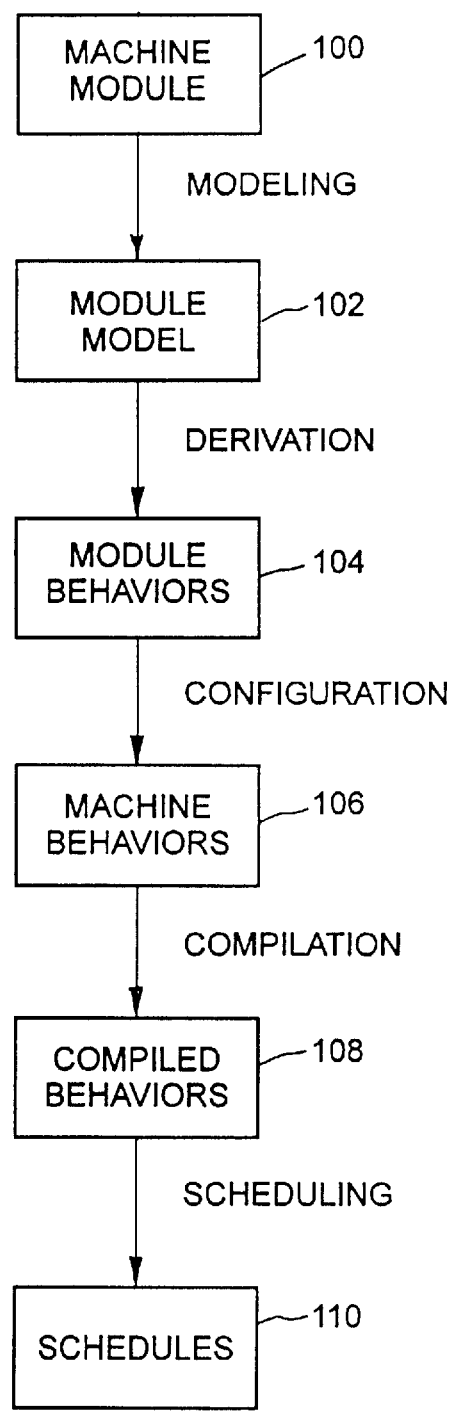
FIG. 2 provides a flow chart detailing the hierarchical ordering of operations to accomplish the configuration and scheduling of the present invention.

Turning next to FIG. 2, the basic format for generic print engine description and scheduling will be described. As alluded to earlier, past attempts for automated print engine scheduling software were based on an analysis of a complete engine configuration. The results of this analysis are required for writing of dedicated software specific to a particular configuration. Conversely, the subject system provides for separation of scheduling software into two parts. In a first part, a scheduler architecture is provided with generic algorithms. In a second part, machine-specific information is also provided in a format detailed below.

Given a document to be printed on a given print engine, a scheduler is provided which serves to identify, schedule, and initiate machine operations for producing a document. In the illustration of FIG. 1, such operations may include feeding of sheets, moving of sheets, preparation of images, transferring of images to sheets, etc. It will be appreciated that a document to be printed typically arrives incrementally (e.g., sheet-by-sheet). Scheduling and schedule execution (printing) usually happen concurrently. As a consequence, machine-specific information used by a scheduler is advantageously structured such that the scheduler is able to identify which operations will produce the required sheet. Further, the system must be aware of constraints which must be observed when scheduling operations. Additionally, the system is provided with a means by which it may send appropriate commands to the modules to allow them to accomplish their available functions.

In the diagram of FIG. 2, the particular system for preparing the machine-specific information is depicted. The system commences by using declarative descriptions (models) of printing engine modules in block 100. Such a model advantageously contains description of a module's structure and potential behavior of its components. As noted in the example of FIG. 1, possible components include feed trays, transport belts, transfer components, inverters, gates, etc. Potential behaviors may be, by way of example, either bypassing an inverter or using it to invert a sheet. The step of modeling is typically performed by an engineer using a modeling language, the details of a preferred embodiment of which will be provided below.

At block 102, a module has already been modeled by its components. Next, an automatic derivation of potential behaviors of an entire module is then fabricated from information obtained from the component models. This derivation may be performed, by way of example, by simulation or partial evaluation, and by envisionment. Simulation is commonly understood as the execution of models to mirror the execution of the real system. Partial evaluation is commonly understood as the partial execution of programs, leaving certain parts of the programs unexecuted and to be evaluated at a later time. Envisionment is commonly understood as the exploration of all potential behaviors of a system by, for example, repeatedly and in various ways exercising simulation or partial evaluation of its models. The resulting module behavior is comprised of an output produced by a particular behavior, inputs from which the output is produced, individual operations required to produce it (its "itinerary"), as well as various constraints on resources and timings to be observed when performing the operations. Some or all of this information may advantageously be precompiled. By way of example, this may be compiled to finite-state machines.

When print engine modules B (FIG. 1) are plugged together to form a new configuration, different module behaviors are collected and automatically composed via the data processor unit C to generate potential behaviors of a complete print engine A.

The afore-noted composition is also suitably enabled to occur dynamically, i.e., each time a behavior is to be selected by the scheduler, it composes module behaviors on-the-fly. Thus, a composition may be done only once (after modules are first plugged together), or each time they are needed. The latter option has an advantage of accounting for dynamic module changes. Thus, the system may complete the FIG. 2 sequence each time a machine behavior is selected. It may be prohibitive to do so, however, due to the time-consuming computations. However, this may be a more efficient approach in specific circumstances.

In block 104, the afore-noted, overall behavior is advantageously modeled in a format similar to that associated with the individual module behavior noted above. Per distinct overall behavior, the system provides an output description (for behavior identification), resource and timing constraints (for sequencing), and data comprising an itinerary (for subsequent control of machine operations).

Next, a portion of machine behavior information is advantageously compiled for efficient use in a matching scheduler algorithm at which point the system progresses to block 106. By way of example, a compilation of potential interactions of timing and resource constraints may be made to a finite-state machine. An example of finite-state machine scheduling may be found in the co-owned U.S. patent application Ser. No. 08/426,207, filed Apr. 21, 1995, entitled PRINT SEQUENCE SCHEDULING SYSTEM FOR DUPLEX PRINTING APPLICATION, the contents of which are incorporated herein by reference. At block 108, a full set of compiled behaviors has been obtained.

Lastly, at block 110, an output description of machine behaviors is used by a generic scheduler to identify behaviors that will produce an output document given the original constraints (either in original or compiled form). These are used to find a correct timing for each particular behavior's operation and itineraries which are used to initiate necessary operations of the modules B.

While the previous description is provided by way of preferred embodiment, it will be appreciated that not all of the steps are required to provide a usable system. For example, only a portion of all components need be modeled and compilation of all constraints need not be accomplished.

With the system described above, modular ("plug-and-play") scheduling of print engine modules is facilitated. The system also allows for reuse of scheduling software for a wide range of configurations. It also provides for automating all steps but that of obtaining the initial description of the discrete modules forming the machine and for development of the generic scheduling algorithms.

Figure 3:
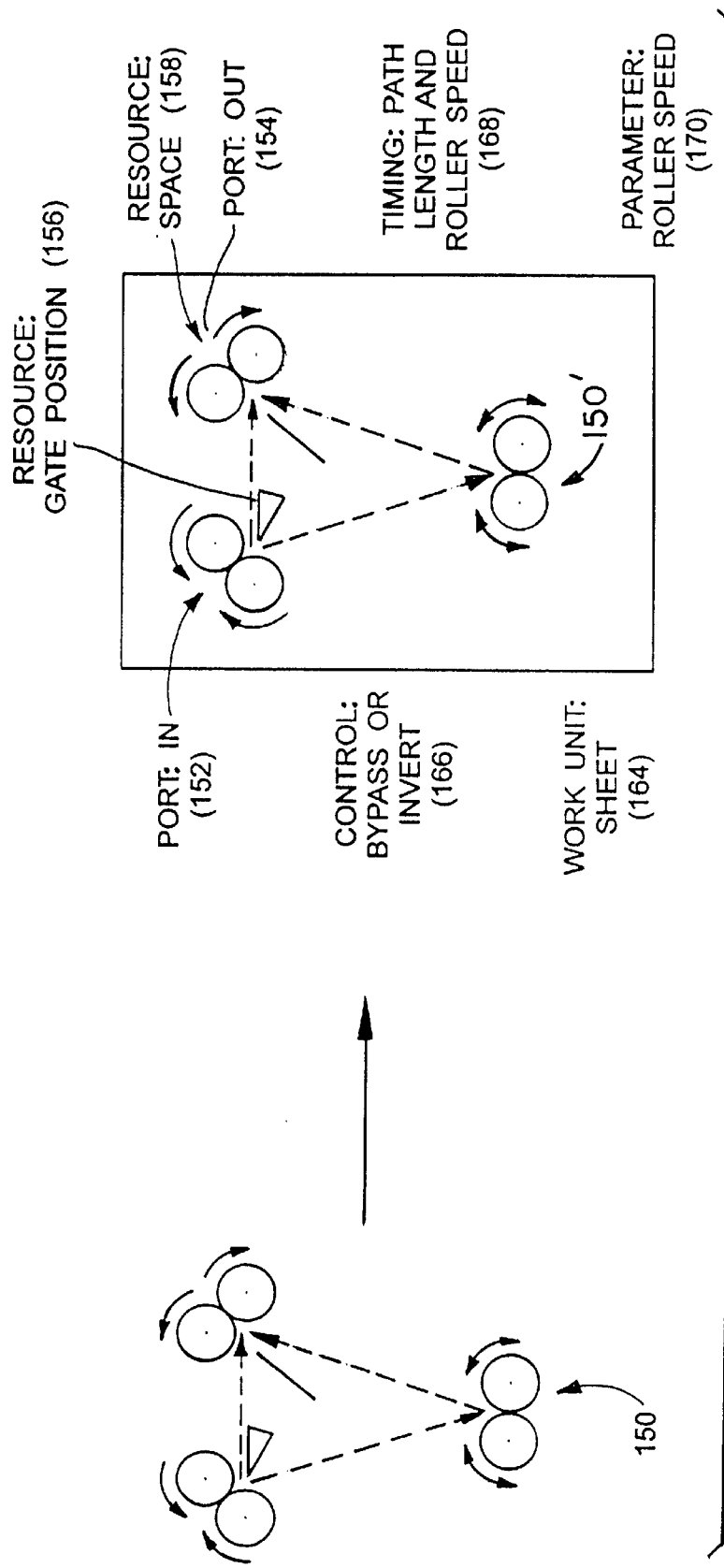
FIG. 3 provides a diagram of a representative, generic description of a print machine component as used in connection with the subject, automated scheduling and configuration of the subject invention.

Turning now to FIG. 3, a particular system for modeling component behavior will be described. The particular system of the preferred embodiment is for a description of print engine component behavior for print engine analysis, simulation, and scheduling. As noted above, the basic, generic description method is equally applicable to various other modular systems.

In the subject description method, structure and behavior of components is described in terms of capabilities (potential operations) for which constraints on work units, timings, and resources are stated. This modeling system enables structural and behavioral composition of components for analysis and simulation of component interactions in print engines. The system is particularly applicable for scheduling operation of modular print engines.

With the subject scheme, one may describe print engine components such that print engines fabricated therefrom may be described by composing component descriptions. Further, various applications may be performed automatically on the resulting print engine description. This enables one to automatically use such information for analysis, simulation, scheduling, and related print engine applications. In the illustrated example of FIG. 3, descriptions associated with an inverter 150, analogous to the inverter 30 of FIG. 1, are provided with model 150'. Components of a modeled structure and behavior are determined by both the physics of the component itself, as well as an application context in which a model is used.

In the system, a structure model of a component is defined as consisting of its physical interface, software interface and internal resources. For example, a physical interface is an input port 152 along which work units (sheets) enter and a port 154 from which said work units exit. Associated software interface functions primarily for control commands and parameters. Internal resources are defined as objects needed to perform a particular behavior, and where multiple uses of the object by repeated execution of the behavior is restricted. By way of example in FIG. 3, a resource is defined as the position of an associated gate 156. Another example of a resource is a space 158 between opposing output rollers 160 of the inverter 150, particularly illustrated at 150'. Here, as with most points of the paper path, there is sufficient space for only one sheet at any single point in time. Thus, the space 158 is defined as a resource.

A behavior model of a component is utilized to describe capabilities of the particular component in terms of how the component may work on work units moving through the component. Further, the behavior dictates what constraints must be observed when performing the associated behavior.

A component capability is defined as consisting of a description of work units and a transformation of work units, timed events like the input and output of a work unit, of resource allocations for this transformation, and of constraints on the timing of such events and resource allocations. Work units are advantageously described in terms of their attributes. Restrictions and transformations of work units are advantageously described in terms of constraints on their attributes.

In FIG. 3, some additional model descriptions are provided. These include a description associated with a particular work unit, such as a sheet illustrated at 164. A control situation,. such as whether or not to bypass the inverter 150 or utilize it for inversion is illustrated at 166. A timing parameter, such as a specification of path length and roller speed is provided at 168. By way of example, associated timing constraints are suitably obtained using a formula based on path length and roller speed, e.g., time out may be defined as time in plus path length, divided by roller speed. Certain values are also suitable parameters of the model, e.g., the path length of a given inverter is fixed, while roller speed may vary and may therefore be set by the environment with respect to a model that is used. A roller speed parameter is illustrated at 170.

By way of particular example, the following listing provides a suitable model of an inverter as depicted in connection with FIG. 3:

```
Component inverter(length: Millimeters, speed: MillimetersPerSecond)Has
    EntryPorts in: Sheet;
    ExitPorts out: Sheet;
    Resources inR, outR: Signal; gateR: State({Bypassing,Inverting},Bypassing);
    Variables s, s_in, s_out: Sheet; t_in, t_out, t_gate: Interval;
    Capability bypass(t_in) Is
        in.input(s, t_in);
        out.output(s, t_out);
        inR.allocate(1, t_in);
        outR.allocate(1, t_out);
        gateR.allocate(Bypassing, t_gate);
        t_in.START + length/speed = t_out.START;
        t_in.D_ON = t_out.DURATION;
        t_gate.START = t_in.START;
        t_gate.END = t_out.END
    End bypass;
    Capability invert(t_in) Is
        in.input(s_in, t_out);
        out.output(s_out, t_out);
        inR.allocate(1, t_in);
        outR.allocate(1, t_out);
        gateR.allocate(Inverting, t_gate);
        s_out = s_in with
                {SHEET.ORIENTATION =
                Rotate Y, 180, s_in.SHEET, ORIENTATION)};
        t_in.START + length/speed +
        SheetLength(s_in.SHEET.SIZE)/speed = t_out.START;
        t_in.DURATION = t_out.DURATION;
        t_gate.START = t_in.START;
        t_gate.END = t_out.END
    End invert
End inverter.
```

This model declares two parameters (length and speed), one entry port (in), one exit port (out), three resources (inR, outR and gateR, of types Signal respectively State), and six variables (of types Sheet and Interval). Then the model defines two capabilities (bypass and invert). For capability bypass, it is defined that a sheet s enters at time t_in and exits at time t_out, that allocations in all three resources are made at the respective intervals t_in, t_out and t_gate, and that various timing constraints reflecting the traveling time from entry to exit hold between the intervals. Capability invert is defined similarly, except that the sheet changes its orientation by 180° (rotated around the y axis), and that the traveling time is longer (proportional to the sheet's size). Thus, it will be appreciated that a complete and functional description of any component may be similarly provided.

With the disclosed modeling system, a component structure is described without relying on any reference to descriptions of or interactions with other components. Such component behavior is described on one work unit without other units. Further, the disclosed modeling system enables automatic behavioral composition of component capabilities for generic and incremental analysis, simulation, and scheduling of print engines. This description format allows automatic structural composition of component models to models describing connected components (for example, print engine modules).

Conversely, earlier approaches had their capabilities and constraints expressed in terms of both specific interactions between components and interactions between sequences of sheets or images. This renders them more difficult to define, renders them non-reusable, and further renders them non-compositional. The system modeling format allows for the automatic configuration, optimization, and scheduling described above.

As will be appreciated from the foregoing, scheduling a print engine means, to a large part, a scheduling of associated resources. To do this effectively, one must model the resources used by a print engine operation such that information may be used for incremental scheduling of valid sequences of those operations. Besides being applicable to a wide range of print engine operations, resources may also suitably serve as generic interfaces between a scheduler and the rest of the print engine control software for purposes of communicating changes in the machine.

Components of a machine, such as a print engine, will usually require resources to perform their capabilities. By way of example particular to a printing machine, a resource may be space on a belt, a gate that must be in a certain position, or some element that is being placed for multiple or overlapping uses. One may view the capacity of a bin of paper as being one instance of such multiple or overlapping uses.

Allocations of resources are suitably modeled explicitly as a part of a description of a component's behavior. As used herein, resource allocation is defined as a specification of a resource requirement, together with a time interval during which a particular resource is required. Again, by way of example, an imaging capability requires space on a photoreceptor belt for a certain amount of time. As another example, an invert capability requires an inverter gate to be in a correct position while a sheet is being inverted.

As defined herein, a resource requirement is chosen to depend on a particular type of resource. Possible resource types include such items as Boolean resources (resources which are either used or not used), enumerated or state resources (which are placed in one of the available states), capacity resources (were concurrent uses add up), and the like. Such resource types are advantageously described generically by resource constraints. Resource constraints, themselves, determine consistency for multiple allocations for the same resource.

By way of example, Boolean resource allocations, such as space on a belt, must not overlap in time. Conversely, state resource allocations may overlap if they require the same state. Capacity resource allocations may overlap if the sum of the requirements never exceeds the given capacity. Such resource types may be extended easily by changing or adding to the afore-noted resource constraints.

Time intervals of resource allocations may suitably be connected by interval constraints. As defined herein, a resource constraint system and an interval constraint system are orthogonal to one another. A description of resource allocations and timing constraints fits well into a compositional modeling paradigm for scheduling.

Figure 4:
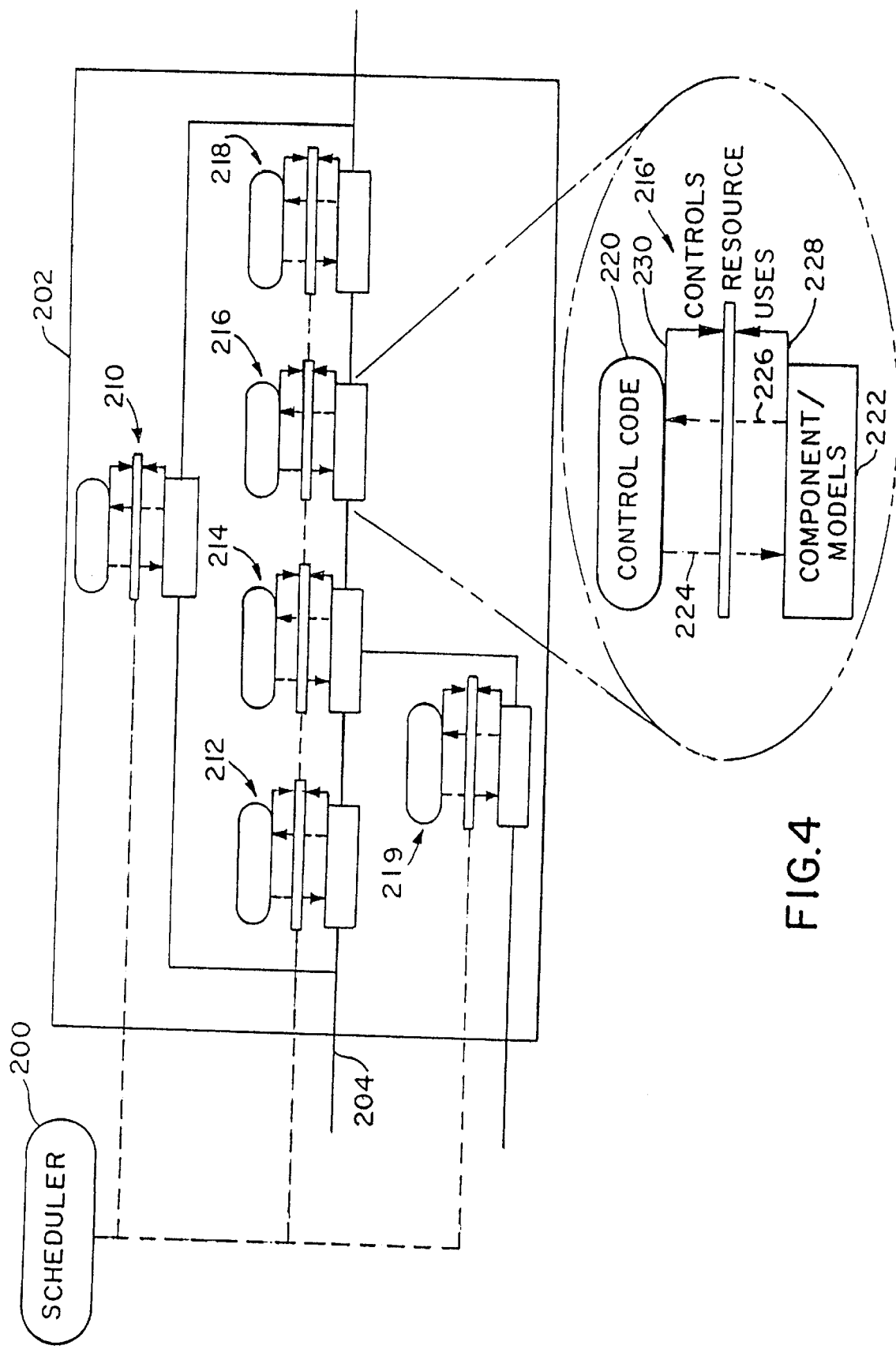
FIG. 4 is a block diagram depicting interaction of scheduler and control code using resources as provided in the subject invention.

Once all components have been fully modeled, a print engine will ultimately be moved to a run time state. Turning particularly to FIG. 4, evidenced therein is a scheduler 200 which is in data communication with a representative print engine module 202. The print engine module 202 is, in turn, comprised of several components, each using resources selectively disposed along a paper/image path 204. Such resources are exemplified by those components respectively, their resources 210, 212, 214, 216, 218, and 219. Each of these resources is suitably described in the same fashion, a representative one of which is detailed at 216'. A system includes a control code portion 220, a component/models portion 222, and various communication paths. The control path 224 allows for passing of control commands from the control code portion 220 to the component/models portion 222. Similarly, a sensor path 226 allows for communication of sensor data in the opposite direction. A path 228 represents the scheduled use of resources by the component; more precisely, it stands for the communication of knowledge from the model 222 describing the component to the scheduler, where this knowledge is used to schedule correct uses of the resource. A path 230 allows for control and sensor information to be similarly communicated to the scheduler 200.

At run time, when scheduling operations, the scheduler 200 instantiates the interval such that the corresponding allocations for the same resources satisfy required resource constraints. This is also suitably done incrementally by keeping track of past resource allocations.

During a normal operation the scheduler 200 takes into account only its own allocations. To do this, it uses its model of the system to predict a use of resources for operations it has scheduled.

That system is also readily adaptable to a real-life, reactive environment wherein resources sometimes become unavailable or become restricted to a subset of the normal capacity. Such variations in real hardware are typically monitored by a module's control software disposed, in the example, in the control code portion 220. It will be appreciated that in earlier systems, the control software was required to have a special interface to the scheduler in order to communicate deviations between modeled and real hardware or to allow for a scheduler to have access to data of the controlled software.

Resource management within the scheduler 200 is suitably made accessible to an environment. More specifically, it is made available to the component control code as represented by 220. As with the scheduler 200, the control code 220 is then suitably enabled to make corresponding calculations in the resources to reflect changes in the hardware. In turn, this enables the scheduler 200 to automatically take system changes into account.

The foregoing models are used to define a default behavior (resource allocations) of component capabilities.

Meanwhile, control code itself dynamically adapts that behavior to reflect a current situation. This is suitably extended even further if an environment is allowed to change the resource constraints. In general, this means that control software is seen as controlling resources (starting from a default definition), while a scheduler is using those resources.

In an actual on-line implementation, a scheduler will advantageously make such future allocations automatically and take them into account. When the scheduler looks ahead to make further allocations, allocations are suitably tagged with different priorities depending on whether they come from the scheduler 200 (respectively models 222) or from the control code 220. With this, any allocations by the scheduler that are inconsistent with allocations by an environment are suitably identified automatically and may be redone.

The subject system provides generic scheduling of software associated with print engine-specific information. This is provided even if a print engine has been composed by a customer from individual print engine modules. The system builds on a description of print engine modules which has been made in accordance with module capabilities. As used herein, a module capability is essentially a potential module output. For example, a module output produced by a module capability of a print engine module may be a sheet of size A4 having two images placed on it and being delivered face-down.

Figure 5:
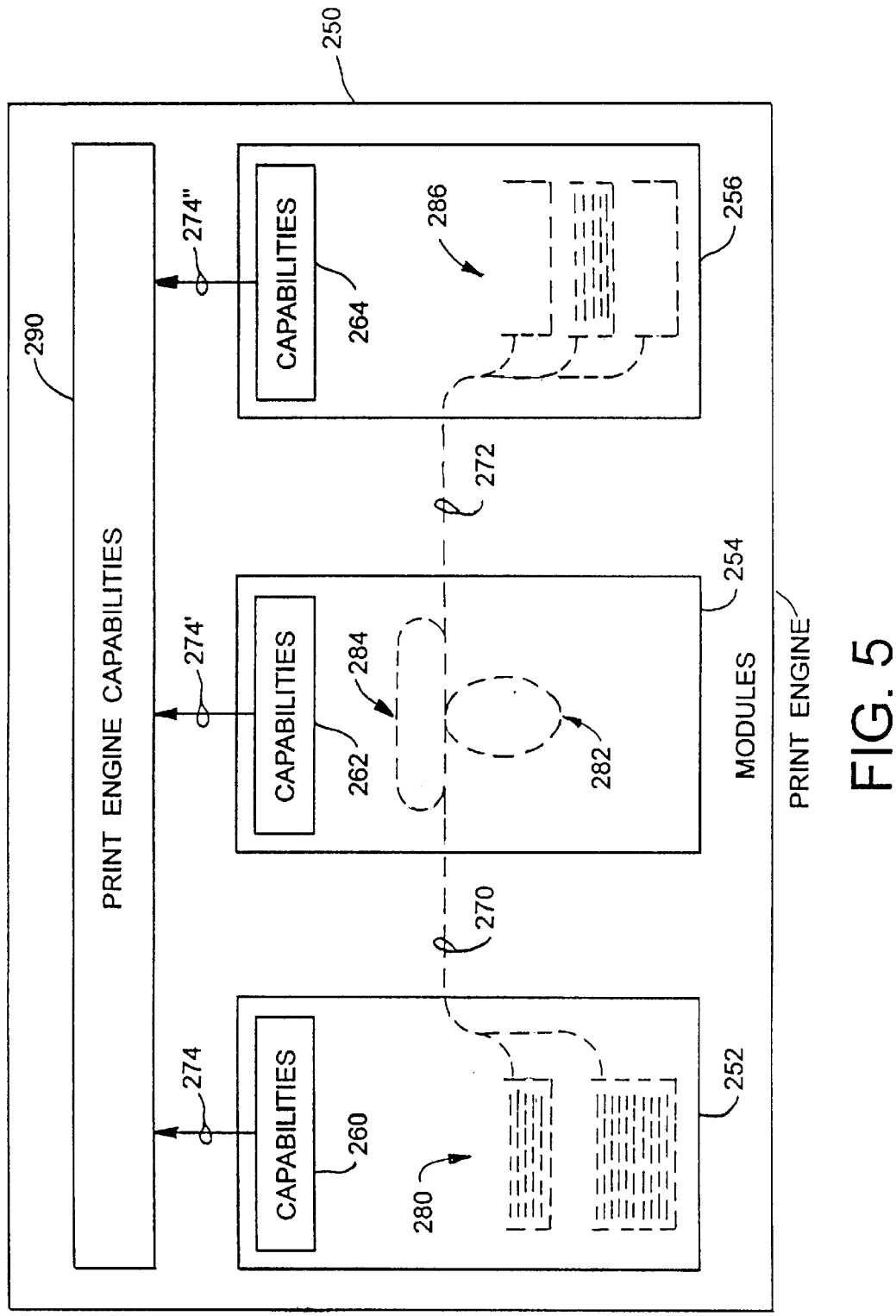
FIG. 5, is a block diagram of the subject system in which print engine capabilities are composed from module capabilities.

More particularly, module capability may be considered a trace of a production of a particular output. This suitably contains descriptions of both input and output work units at module ports. Turning particularly to FIG. 5, representative print engine 250 includes modules 252, 254, and 256 which are connected at ports 270 and 272, respectively. These modules are provided with illustrated capabilities 260, 262, and 264, respectively. The illustration further provides data communication paths 274 for modules 252, 254, and 256 to report their capabilities to the print engine control software.

By way of particular example, the illustration provides that module 252 contains input trays 280. The module 254 contains a photoreceptor 282 and a duplex feedback mechanism 284. The module 256 provides output trays 286.

A module capability suitably contains a description of both input and output work units associated with the module entry and exit ports, respectively resource allocations required for a desired production and an itinerary through which an output is produced. Work units are suitably described by constraints on their attributes. Resource allocations are stated together with constraints on their time intervals.

A module's resource allocations may suitably exist in compiled form. For example, resource allocations may exist as possible variations of allocations in a finite-state machine.

For the purpose of illustration, let <I, O, R, C> reflect a particular capability with inputs I, output O, resource allocations R, and an itinerary C. When modules forming a new print engine are plugged together and the engine is started up, the scheduler or another connected software component configures itself by collecting and composing module capabilities 290 which are obtained from all modules from a print engine via connections 274, 274', and 274".

Module capabilities are composed to machine capabilities by recursively composing module capabilities of two machine modules connected at a port. For example, if first and second modules are connected at port p, then for every module capability $<I_1,O_1,R_1,C_1>$ of a first module that produces an output at p (defined by $O_1$), and for every module capability $<I_2, O_2, R_2, C_2>$ of a second module that expects an input at p (defined in $I_2$), the capabilities are suitably composed if a respective input and output in $O_1$ and $I_2$ can be unified. Attribute constraints are propagated in the process.

For example, if $O_1$ restricts the sheet size, this is propagated via $I_2$ to the second capability. Upon successful unification, composite capability $<I, O, R, C>$ is generated by setting I to $I_1+I_2$ without port p's input in $I_2$, O to $O_2$, R to $R_1$ joined to $R_2$, and C to $C_1$ concatenated with $C_2$.

This composition of module capabilities will be performed until a resulting capability contains only inputs and outputs that are not inputs and outputs at ports between modules. That is, there are no further module capabilities that are connected to the inputs or outputs. Such a resulting capability is a print engine capability. As modules typically have several distinct capabilities, each composition of module capabilities will be performed for all alternatives, resulting in a multitude of print engine capabilities. For example, if each module in FIG. 5 has two capabilities, the complete print engine has potentially eight capabilities; less if the inputs of some module capabilities cannot be unified with the outputs of other module capabilities.

It will be appreciated that this method also works for circular paths, where the same work unit moves (possibly through several modules) back to the same port one or more times, as long as its attributes are uniquely changed each time, and there is only a finite number of accepted attribute values in inputs and/or outputs.

Such composition of module capabilities may be performed efficiently. This is especially important insofar as print engine start-up time is ideally very low. A particular advantage of this system is that it produces a description of a module print engine that enables the scheduler at run time to generically schedule operations in the print engine's modules. Through propagation of work unit attribute constraints and composition of resource allocations with timing constraints, the scheduler is guaranteed to allow only correct interactions between modules.

For example, if delays between sheets are required in a finisher module, the system will suitably and automatically propagate this to all previous modules as required. As noted earlier, this is in contrast to former approaches wherein potential interactions between print engine modules must be known at the time the scheduling software is developed.

As a variation, the composition of module capabilities is not performed when the print engine is started up, but instead at each time a complete print engine capability has to be identified by the scheduler. In this case, the method described above is suitably performed backwards through the modules, starting with an attribute description of a desired output at a print engine exit port, and matching that output description against output descriptions of module capabilities producing outputs at that port. Then the method will again unify inputs of selected module capabilities with outputs of connected, previous module capabilities. If an input cannot be unified with an output of a connected, previous module capability (i.e. the desired input cannot be produced by the previous module), the method back tracks and tries alternative module capabilities. Such composition is done until all inputs of the resulting capability are inputs of the print engine. The result is a print engine capability able to produce the desired output. The remaining data, resource, timing, and itinerary information, are composed as described above, and can then be used for the correct scheduling and execution of the resulting capability.

Next, a system for generically scheduling operations necessary to produce desired documents on a print engine will be described. This operation builds on a separation of generic scheduling algorithms and print engine-specific information. This allows both the algorithms and the print engine architecture to be reusable for a wide range of print engine families. This is in contrast to earlier methods wherein information about a print engine for a scheduler was developed and built into the scheduling algorithms. Thus, in these earlier systems, the incorporated algorithms could not be reused easily.

Figure 6:
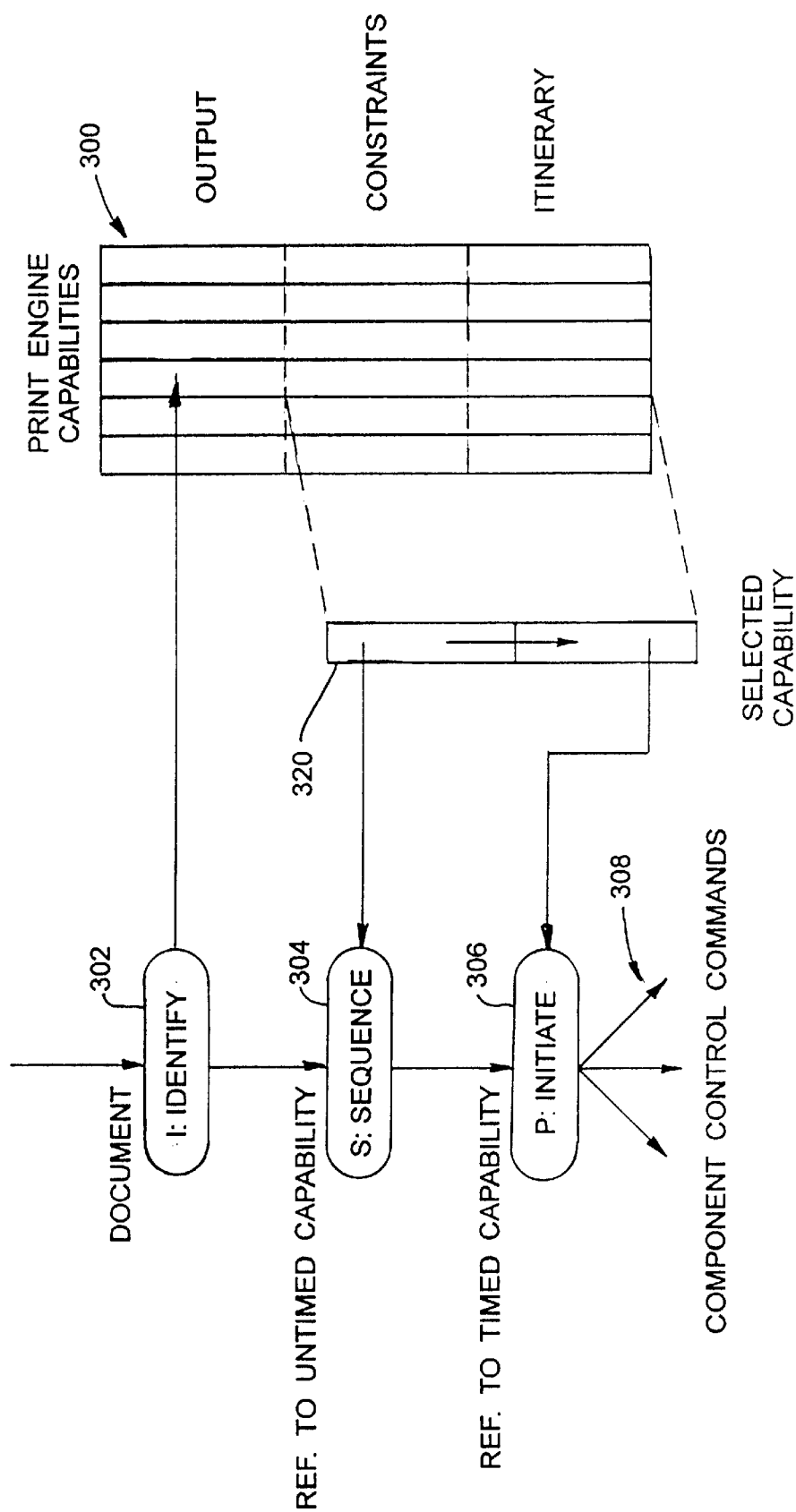
FIG. 6 is a diagram of a generic scheduling with print engine capabilities.

Turning particularly to FIG. 6, a set of print engine capabilities is represented at 300. Actual scheduling of printing machine operation includes a step 302 of identifying a set of operations necessary to accomplish the desired result. Next, a sequence of these operations is determined at block 304. At block 306, actual initiation of the scheduling of print machine operation is accomplished and a set of component control commands is provided as an output from the scheduling system at 308.

From the illustration of FIG. 6, the print engine capabilities 300 will be noted to include information as to output, constraints, and itinerary information. The block 302 identification results in the generation of a subset of such capabilities, which subset is illustrated generally at 320. The selected capabilities 320 are, in turn, utilized in connection with the sequence operation 304 and the initiation operation 306.

Tracing the flow of an actual document through the system of FIG. 6 commences when an actual input on the desired document is provided to the identification block 302. From this point, the required capabilities necessary to accomplish formation of the desired document is determined. The output of the identification block 302 provides such raw capabilities in an un-timed form. In the sequence block 304, the timing information necessary to accomplish formation of the document is provided. Thus, the output from block 304 to 306 has provided with it a reference to time capabilities. As noted above, this returns the component control commands at 308.

In the subject system, scheduling typically has to work incrementally and concurrently to printing, such as on a per-sheet basis. Thus, in the illustration of FIG. 6, the system is noted to be split into several components to accomplish each of these tasks.

A suitable example of print engine capability such as that found at 300 in FIG. 6 may be a potential print engine output. For example, such an output may be a face-down A4 sheet having two images on it. In more detail, a print engine capability contains descriptions of an output work as defined at a machine's exit ports, resource allocations required for producing the output and an itinerary through which the output is produced. Work units, such as sheets in a print engine, are suitably described by constraints on their attributes as noted in detail above. Such resource allocations are advantageously stated together with constraints on their time intervals.

Next, a system for automatically generating finite-state machines to allow for scheduling of print engine capabilities will be described.

Capability timing constraints are interval constraints. If the timing constraints of capabilities contain no inequality constraints, they have a finite reach-back, i.e. their set of intervals always lies within a finite interval. This has two important consequences for a scheduling algorithm searching for optimal schedules: the scheduler never has to search beyond the maximum reach-back of a set of capabilities, and the maximum reach-back defines an equivalence relation for schedules. (Capabilities without inequalities are called rigid capabilities. The entire method is also applicable for flexible capabilities, i.e. capabilities with inequality constraints, by approximating inequalities with equalities. However, the resulting finite-state machine may not be optimal.)

Capability derivation results in signals and timing constraints. (From now on, the term "capability" will be used to denote just the set of signals and constraints of one derived capability.) Signals are sequences of non-overlapping events (at exit ports of configuration components); events are actions associated with intervals; timing constraints are unary and binary interval constraints.

Let there be m capabilities. In each capability j let there be n ordered signals $S_i(j)=[t_1(i,j), \ldots t_{n(i,j)}(i,j)]$ ($i=1,\ldots,n$ is called the signal index, $j=1,\ldots,m$ the capability index). Here, only the interval t of the signal's events are represented; $n_i(j)$ may be 0. Let $t_{out}(j)=(s_{out}(j),d_{out}(j))$ be the end interval of capability j, i.e. the interval in that signal that corresponds to the configuration's output port. All timing constraints are about intervals in the signals $S_i(j)$.

If constraints are left out and checked at run-time in order to reduce the state space of the finite-state machine, this might show up at several places below. For example, if aligned and inPeriod constraints are excluded from the following analysis, the capability period will usually be much smaller. Alternatively, entire signals and their constraints can be excluded, which would strengthen the equivalence relation.

For incremental optimal scheduling, the following analyses and resulting parameters are necessary. (Note that there are other, application-independent analyses such as simplifications of capabilities that can be applied beforehand.)

Instantiation

The analysis starts by instantiating each capability end to 0:

$$\forall j=1,\ldots m: s_{out}{}^j=0$$

As all binary constraints are equality constraints, this instantiates all other intervals as well, and the binary constraints can be removed. The remaining constraints (e.g., aligned, inPeriod and noPass) are called integration constraints. After the instantiation, a capability can be integrated into an existing schedule by shifting all intervals by a constant amount and checking the integration constraints.

Normalization

For each signal index i, let the normalization shift $u_i$ be the minimum distance over all capabilities between the signal's last interval and the end of the capability, i.e. for instantiated capabilities:

$$\forall i = 1,\ldots,n: u_i = \max_{j=1},\ldots,m(s_{n_i}^{ij})$$

(where $s_{n(i,j)}(i,j)$ is the start of $t_{n(i,j)}(i,j)$, the last interval in signal $S_i(j)$. The normalization constants $u_i$ are negative or 0.

Note that if a signal i is shifted in all capabilities by $u_i$, at least one signal $S_i(j)$ in some capability j will start its last interval at 0.

Reach-backs

For each signal i, let the normalized reach-back $r_i$ be the distance between the maximum start of a signal's last interval in any capability and the minimum start of a signal's first interval in any capability, i.e. for instantiated capabilities with normalization shifts:

$$\forall i=1,\ldots,n: r_i=\max_{j=1},\ldots,m(-(s_1{}^{ij}-u_i))$$

(where $s_1(i,j)$ is the start of $t_1(i,j)$, the first interval in signal $S_i(j)$. Let the maximum reach-back $r_{max}=\max_{i=1,\ldots,n}(r_i)$.

Increment

When searching for an optimal placement of a capability, the scheduler doesn't have to try every millisecond. Instead, a minimum increment can be calculated from the timing constraints. This can be done by collecting all interval starts and durations of the instantiated capabilities and all constraints from aligned and inPeriod constraints, and by computing the greatest common denominator ("GCD") of these numbers. Let inc be the resulting increment.

Period

Given aligned and inPeriod constraints, which restrict intervals relative to certain clocks, a capability period can be identified. (For example, certain timings can be identified as equivalent for our purposes if they are identical modulo the period.) Let period p be the maximum period constant in any inPeriod constraint over all capabilities, or the maximum alignment factor in any aligned constraint over all capabilities if no inPeriod constraint exists, or the increment inc if neither inPeriod nor aligned constraints exist.

Extension

Given maximum reach-back $r_{max}$ and period p, the offset from the end of a given schedule to a newly integrated capability can be bounded. Let the minimum extension bound ext=max($r_{max}$,p). States that contain only resource allocations coming from one capability are called basic states. When extending a state by a capability, the largest extension should result in a basic state. In the presence of a period, all basic states for all ends within the period have to be reached. If, for a capability j, ext$-r_j$+inc is equal to or larger than the period p, the minimum extension bound ext is sufficient to extend a state to all basic states. Otherwise, the extension bound has to be increased by the difference. Therefore, for each capability j, let ext$_j$=ext+max(0,p−(ext−$r_j$+inc)).

Given the capability parameters above, a finite-state machine can be generated by first generating all initial states, and then extending these states by integrating capabilities at various offsets and deriving new states. This requires several operations on schedules and states, namely extending schedules, clipping schedules to states, normalizing states, and checking state equivalence. (The definitions of extension and clipping are given for forward scheduling; the corresponding definitions for backward scheduling are similar.)

Schedule extension

A schedule consists of a set of signals and a set of no-passing constraints. A schedule S is extended with capability j at offset o to new schedule S' by shifting the instantiated capability by o and integrating its signals and no-passing constraints with S. A capability can be integrated successfully if none of its shifted intervals overlap with intervals in the same signals, and if all integration constraints hold. Because capabilities have to be scheduled in order, the next possible offset o' is o+$d_{out}(j)$. Let the interface of this function be integrate(+S,+o,+j,−S'−o').

Schedule clipping

After each extension, only the part that is in the reach-back of future signals is of interest. Let a schedule state be a schedule clipped accordingly. That is, given schedule S', a state S" is derived by clipping all signals $S_i$ below lower bound $l_i$=e−$r_i$+$u_i$, where e=o' is the state's end (as computed by the integration above), and $r_i$ and $u_i$ are reach-back and normalization shift for signal index i. Similarly, all no-passing constraints where both intervals are less than or equal to the lower bounds of their respective signals can be removed. The common rationale for clipping is that the constraints being removed (intervals and no-passing constraints) cannot be violated by future extension. Let the interface of this function be clip(+S',+e,−S").

State normalization

Before states can be compared, they have to be normalized. State normalization means shifting the state such that it ends within the interval [O,p], i.e. given a state S", a normalized state S''' is derived by shifting all intervals by (e mod p−e), where e is the end of state S'''. Let the interface of this function be normalize(+S",−S''').

State equivalence

Two normalized states are equivalent if they are identical in the allocation of intervals in their signals, and if they have identical no-passing constraints.

In the following, the generation method is described for forward scheduling. The corresponding method for backward scheduling differs only in its use of the appropriate backward extension and clipping functions, and, where values are enumerated from O to some bound x, in the enumeration of these values from 0 down to −x.

In general, the generation method records every normalized state together with an index (not explicitly shown in the algorithm). Also, for each extension from state $S_1$ to state $S_2$ by capability j displaced by d, the transition (index($S_1$),j,d, index($S_2$)) is recorded. Of course, if an extension reaches an already existing state (as determined by the equivalence function), that state's index is used. Displacement d is the distance between the end of S and the end-interval start $s_{out}$ of capability j.

Generating initial states

For each e in {O, inc, . . . , p−inc}, an initial state is generated by producing a state with end e that has one allocation per resource, where the interval of an allocation for resource j extends from e−$r_j$ to e. The allocation requirement depends on the type of resource and corresponds to the initial state that the corresponding real object will initially be in. Let I be the set of initial states.

Generating all states and transitions

The main generation method starts from the initial states I and successively extends states to generate new states. Thus, starting with states I, the following algorithm is executed for every state S (with end e) and every capability j.

```
d = 0
repeat
    while not integrate(s, e+d, j, S', e') do d = d+inc end
    clip(S', e',S")
    normalize (S",S"')
    record S"' if it is a new state
    if in iptimal scheduling mode then
        if d < ext_j then
            d = d+inc
        else
            done = true
        end
    elsif in greedy scheduling mode then
        done = true
    end
until done
```

The simpler algorithm generating only optimal finite-state machines would be the follow:

```
for all offsets d incremented by inc from O to ext_j do
    if integrate(s, e+d, j, S', e') then
        clip(S', e', S")
        normalize(S",S"')
        record S"' if it is a new state
        record transition < index(S),j,d,index(S"') >
    end
end
```

For greedy scheduling, only the first extension for each state and capability has to be recorded. Note that all extensions with displacement greater than or equal to ext result in initial states of capability j. For optimal scheduling there must be one such extension to every initial state.

The above method also allows one to generate finite-state machines in the range between greedy and optimal search strategies by choosing smaller reach-backs and extension then the computed ones.

The resulting transition relation defines the finite-state machine.

Figure 7:
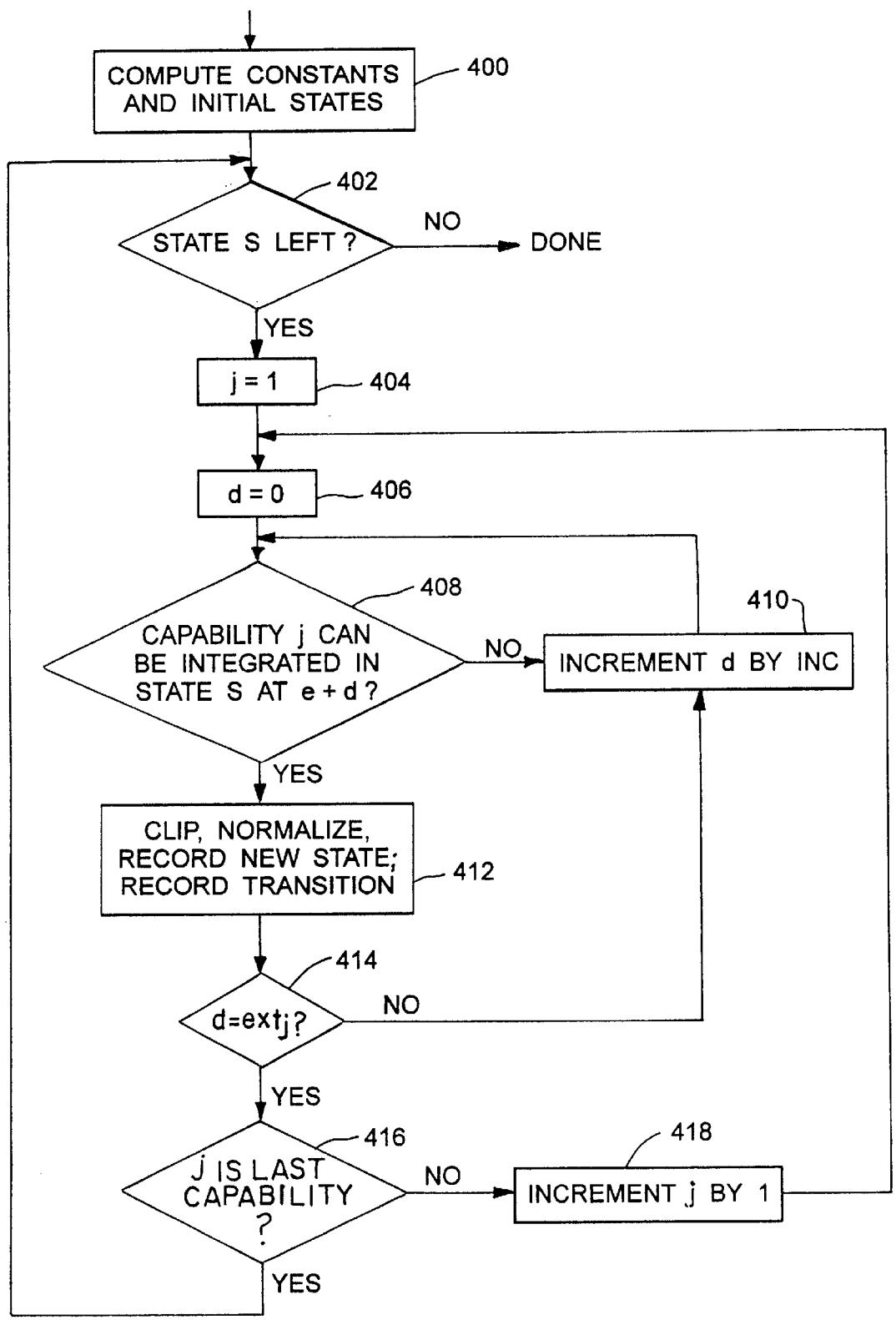
FIG. 7 is a flow chart of a suitable algorithm for generating an optimal finite-state machine.

Turning now to FIG. 7, a flow chart provided to show a suitable algorithm for generating a optimal finite-state machine. The algorithm commences at block 400. At this point, both constants and initial states are computed. Next, progress is made to block 402. If there is no state S remaining at this point, the process is complete. If there is, progress is made to block 404.

At block 404, a constant j is set equal to one. Next, at block 406, a constant d is set equal to zero. From this point, progress is made to block 408, from where a determination is made as to whether a capability j may be integrated into state S at e+d.

A negative determination results in an increment of d by an increment value inc at block 410. From this point, progress is returned to block 408. A positive determination at block 408 results in progress to block 412. At this point, the system functions to clip, normalized, record a new state, and record a transition.

Next, at block 414, a determination is made as to whether d=the value $ext_j$. A no determination causes progress to block 410, at which the increment noted above is provided. A positive determination at block 414 results in progress to 416.

At block 416, the value of j is checked to determine whether it is a last capability. If so, progress is returned to block 402 as noted above. If no, the value of j is incremented at block 418 and progress is returned to block 406, as noted above.

This invention has been described with reference to the preferred embodiment. Obviously, modifications and alterations will occur to others upon a reading and understanding of the specification. It is intended that all such modifications and alterations be included insofar as they come within the scope of the appended claims or the equivalents thereof.

Having thus described the invention, it is now claimed:

1. A system for scheduling a print engine using finite-state machines comprising:

means for receiving a plurality of print engine component capabilities, each component capability being defined by a component capability data set;

derivation means for deriving signal data and timing constraint data from each data set, wherein signal data, defining a signal, is formed as a sequence of non-overlapping events on a corresponding print engine component, an event being an action of the corresponding print engine component associated with a time interval for completing an operation, and timing constraint data is defined as one of unary and binary interval constraints on the corresponding print engine component;

analysis means for analyzing the plurality of print engine component capabilities in accordance with the defined data set, signal data and timing constraint data, the analysis means including, instantiation means for instantiating each of the plurality of print engine component capability data sets to zero, signal normalization means for normalizing each signal, reach-back means for defining a reach-back value as a distance between a maximum start of a most recent interval associated with each signal and a minimum start of that signal's first interval, increment means for determining a minimum increment in accordance with timing constraint data of each data set, period identification means for identifying a period defined from restricted intervals relative to a selected clock value and extension means for defining a bound value in accordance with a maximum reach-back value and a period;

obtaining means for obtaining component capability parameters of the plurality of print engine component capabilities based on the analysis of the plurality of print engine component capabilities;

finite-state machine generating means for generating finite-state machines based on the obtained component capability parameters; and, scheduling means for scheduling a print engine using the generated finite-state machines.

2. The system for scheduling a print engine using finite-state machines according to claim 1 wherein the finite-state machine generating means further comprises:

extension means for extending schedules, wherein schedules are defined as a set of signals and an associated set of no-passing constraints, to form shifted intervals;

schedule clipping means for clipping schedules to states such that only that part of each signal defined within the reach-back value is retained;

state normalization means for normalizing remaining states; and state comparison means for determining equivalence between states.

3. The system for scheduling a print engine using finite-state machines according to claim 2 wherein the finite-state machine generating means further comprises:

means for generating a set of initial states including,
means defining an initially empty state,
means for extending the initially empty state by selected offsets to form initial states,
initial state clipping means for clipping the set of initial states,
initial state normalization means for normalizing clipped initial states,
initial state comparison means for determining equivalence between normalized initial states, and means for generating a complete set of states and transitions therebetween.

4. A system for analyzing printing machine capabilities for generating finite-state machines for print engine scheduling wherein, each of $i_1, \ldots, i_n$ represent a signal, wherein n is a positive integer signal index, each of $j_1, \ldots, j_m$ represent a capability, wherein m is a positive integer capability index, $t_n$ defines one of a plurality of intervals, an end interval of capability j is $t^j_{out}$ defined as $<s^j_{out}, d^j_{out}>$ provided at an output port of the print engine, and in each capability there are n ordered signals $S^j_i$ equals:

$$S_i(j) = [t_1(i,j), \ldots, t_{n(i,j)}(i,j)];$$

the system comprising:

analysis means for analyzing a plurality of print engine component capabilities, the analysis means including, instantiating means for instantiating each capability end to zero by $$\forall j=1, \ldots, m: s^j_{out} = 0,$$

signal normalization means for normalizing each signal according to $$\forall i = 1, \ldots, n: u_i = \max_{j=1}, \ldots, m(s^{ij}_{n_i}),$$

reach-back means for defining a reach-back value as a distance between a maximum start of a most recent interval associated with each signal and a minimum start of that signal's first interval according to $$\forall i=1, \ldots, n: r_i = \max_{j=1}, \ldots m(-(s_1^{ij} - u_i))$$

increment means for determining a minimum increment as a greatest common denominator of at least all interval starts and durations of instantiated capabilities, period identification means for identifying a period defined from restricted intervals relative to a selected clock value and extension means for defining a bound value in accordance with a maximum reach-back value and a period;

obtaining means for obtaining component capability parameters of the plurality of print engine component capabilities based on the analysis of the plurality of print engine component capabilities;

finite-state generating means for generating finite-state machines based on the obtained component capability parameters; and, scheduling means for scheduling a print engine using the generated finite-state machines.

5. The system for analyzing printing machine capabilities for generating finite state machines for print engine scheduling of claim 4 wherein the period identification means includes means for identifying the period as at least one of:

a maximum period constant in any inPeriod constraint over all capabilities;

a maximum alignment factor in any aligned constraint over all capabilities; and the minimum increment.

6. A system for scheduling a machine using finite-state machines comprising:

means for receiving a plurality of machine component capabilities, each component capability being defined by a component capability data set;

derivation means for deriving signal data and timing constraint data from each data set, wherein
signal data, defining a signal, is formed as a sequence of non-overlapping events on a corresponding machine component, an event being an action of the corresponding machine component associated with a time interval for completing an operation, and
timing constraint data is defined as one of unary and binary interval constraints on the corresponding machine component;
analysis means for analyzing the plurality of machine component capabilities in accordance with the defined data set, signal data and timing constraint data, the analysis means including,
instantiation means for instantiating each of the plurality of machine component capability data sets to zero,
signal normalization means for normalizing each signal,
reach-back means for defining a reach-back value as a distance between a maximum start of a most recent interval associated with each signal and a minimum start of that signal's first interval,
increment means for determining a minimum increment in accordance with timing constraint data of each data set,
period identification means for identifying a period defined from restricted intervals relative to a selected clock value, and
extension means for defining a bound value in accordance with a maximum reach-back value and a period;
obtaining means for obtaining component capability parameters of the plurality of machine component capabilities based on the analysis of the plurality of machine component capabilities;
finite-state machine generating means for generating finite-state machines based on the obtained component capability parameters; and,
scheduling means for scheduling a machine using the generated finite-state machines.

7. The system for scheduling a machine using finite-state machines according to claim 6 wherein the finite-state machine generating means further comprises:
extension means for extending schedules, wherein schedules are defined as a set of signals and an associated set of no-passing constraints, to form shifted intervals;
schedule clipping means for clipping schedules to states such that only that part of each signal defined within the reach-back value is retained;
state normalization means for normalizing remaining states; and
state comparison means for determining equivalence between states.

8. The system for scheduling a machine using finite-state machines according to claim 7 wherein the finite-state machine generating means further comprises:
means for generating a set of initial states including,
means defining an initially empty state,
means for extending the initially empty state by selected offsets to form initial states,
initial state clipping means for clipping the set of initial states,
initial state normalization means for normalizing clipped initial states,
initial state comparison means for determining equivalence between normalized initial states, and
means for generating a complete set of states and transitions therebetween.

9. A method for scheduling a print engine using finite-state machines, the method comprising:
receiving a plurality of print engine component capabilities, each component capability being defined by a component capability data set;
deriving signal data and timing constraint data from each data set, wherein
signal data, defining a signal, is formed as a sequence of non-overlapping events on a corresponding print engine component, an event being an action of the corresponding print engine component associated with a time interval for completing an operation, and
timing constraint data is defined as one of unary and binary interval constraints on the corresponding print engine component;
analyzing the plurality of print engine component capabilities using the defined data set, signal data and timing constraint data, the analyzing step including,
instantiating each of the plurality of print engine component capability data sets to zero,
normalizing each signal which defines the signal data,
defining a reach-back value as a distance between a maximum start of a most recent interval associated with each signal and a minimum start of that signal's first interval,
determining a minimum increment in accordance with timing constraint data of each data set,
identifying a period defined from restricted intervals relative to a selected clock value, and
defining a bound value in accordance with a maximum reach-back value and a period;
obtaining component capability parameters of the plurality of print engine component capabilities based on the analyzing step of the plurality of print engine component capabilities;
generating finite-state machines based on the obtained component capability parameters; and,
scheduling a print engine using the generated finite-state machines.

10. The method for scheduling a print engine using finite-state machines according to claim 9 wherein generating the finite-state machines further comprise:
extending schedules, wherein schedules are defined as a set of signals and an associated set of no-passing constraints, to form shifted intervals;
clipping schedules to states such that only that part of each signal defined within the reach-back value is retained;
normalizing remaining states; and
determining equivalence between states.

11. The method for scheduling a print engine using finite-state machines according to claim 10, wherein generating the finite-state machines further comprise:
generating a set of initial states including,
defining an initially empty state,
extending the initially empty state by selected offsets to form initial states,
clipping the set of initial states,
normalizing clipped initial states,
initial state comparison means for determining equivalence between normalized initial states, and
generating a complete set of states and transitions therebetween.

12. A method for scheduling a machine using finite-state machines, the method comprising:

receiving a plurality of machine component capabilities, each component capability being defined by a component capability data set;

deriving signal data and timing constraint data from each data set, wherein
- signal data, defining a signal, is formed as a sequence of non-overlapping events on a corresponding machine component, an event being an action of the corresponding machine component associated with a time interval for completing an operation, and
- timing constraint data is defined as one of unary and binary interval constraints on the corresponding machine component;

analyzing the plurality of machine component capabilities using the defined data set, signal data and timing constraint data, the analyzing step including,
- instantiating each of the plurality of machine component capability data sets to zero,
- normalizing each signal which defines the signal data,
- defining a reach-back value as a distance between a maximum start of a most recent interval associated with each signal and a minimum start of that signal's first interval,
- determining a minimum increment in accordance with timing constraint data of each data set,
- identifying a period defined from restricted intervals relative to a selected clock value, and
- defining a bound value in accordance with a maximum reach-back value and a period;

obtaining component capability parameters of the plurality of machine component capabilities based on the analyzing step of the plurality of machine component capabilities;

generating finite-state machines based on the obtained component capability parameters; and, scheduling a machine using the generated finite-state machines.

13. The method for scheduling a machine using finite-state machines according to claim 12, wherein generating the finite-state machines further comprise:
- extending schedules, wherein schedules are defined as a set of signals and an associated set of no-passing constraints, to form shifted intervals;
- clipping schedules to states such that only that part of each signal defined within the reach-back value is retained;
- normalizing remaining states; and
- determining equivalence between states.

14. The method for scheduling a machine using finite-state machines according to claim 13, wherein the finite-state machines further comprise:
- generating a set of initial states including,
  - defining an initially empty state,
  - extending the initially empty state by selected offsets to form initial states,
  - clipping the set of initial states,
  - normalizing clipped initial states,
  - initial state comparison means for determining equivalence between normalized initial states, and
  - generating a complete set of states and transitions therebetween.

15. The system for scheduling a print engine using finite-state machines according to claim 1 further comprising means for printing in accordance with the scheduling.

16. The system for scheduling a machine using finite-state machines according to claim 6 further comprising means for generating an output in accordance with the scheduling.

17. The method for scheduling a print engine using finite-state machines according to claim 9 further comprising printing in accordance with the scheduling.

18. The method for scheduling a machine using finite state machines according to claim 12 further comprising generating an output in accordance with the scheduling.

* * * * *